Feb. 8, 1944.  S. SIEGEL  2,340,992

DEVICE FOR MEASURING VISCOSITY OF LIQUIDS

Filed July 25, 1942

WITNESSES:

INVENTOR
Sidney Siegel.
BY
Hymen Diamond
ATTORNEY

Patented Feb. 8, 1944

2,340,992

UNITED STATES PATENT OFFICE 2,340,992

DEVICE FOR MEASURING VISCOSITY OF LIQUIDS

Sidney Siegel, Wilkinsburg, Pa., assignor to Westinghouse Electric & Manufacturing Company, East Pittsburgh, Pa., a corporation of Pennsylvania Application July 25, 1942, Serial No. 452,292

2 Claims. (Cl. 265—11)

This invention relates to devices for determining the viscosity of liquids. More particularly, it relates to a type of viscosity measuring apparatus which will give a continuous indication directly in units of centipoise for any quantity of liquid desired to be measured.

Viscosity may be defined mathematically as the quotient of shearing force per unit area divided by the rate of variation of velocity as to distance along a line perpendicular to the plane along which the shearing force is measured. In a body of liquid in which vibrations exist, there is no net flow per unit time across any surface in the liquid, but the vibrational energy dissipated as heat is directly related to the above defined viscosity. The term generally refers to liquid mediums and this shearing force is difficult to measure directly.

Certain viscosity measuring devices in accordance with teachings of the prior art of which I am aware, depend on the time element required for a liquid to pass through certain orifices under a certain pressure. These methods require for the indication the measurement of time periods. The calibration in terms of viscosity is made in arbitrary units and the operation is generally too lengthy for rapid production testing.

A particular feature of the present invention is a viscosity measuring apparatus which is a small and compact structure and can be handled easily for any liquid medium and also for very small quantities of liquids.

An advantage of the apparatus is that a direct reading electrical instrument is used to indicate viscosity continuously without any time delay for each individual application.

Another advantage of the apparatus in accordance with this invention is that rapid and continuous measurements can be made at times when the liquid undergoes a change of viscosity during a chemical or mixing process.

A further advantage of the apparatus resides in its mechanical stability and electrical as well as mechanical simplicity which make it adaptable for viscosity measurements under conditions where other types of devices cannot be used.

The principle of operation of the viscosimeter in accordance with this invention is based on the torsional vibration of a body constrained by a piezo-electric vibratile frequency responsive element. The body is immersed in the liquid, the viscosity of which is to be determined. Simple oscillation producing means are provided for subjecting the vibratile element to vibration at frequencies within the response range of the crystal element. The vibration produced in the crystal element is of the torsional type which is particularly advantageous for viscosity determination. The reason for this is that a body under torsional vibration in a liquid medium will be damped only by the liquid mass, there being no losses due to internal damping. The damping which the device receives due to the liquid medium is related to its viscosity. The amplitude of the mechanical vibrations as a function of frequency forms the basis for indicating the damping of the system and hence the viscosity of the liquid.

Other features and advantages will be apparent from the following description of the invention, pointed out in particularity by the appended claims, and taken in connection with the accompanying drawing, in which:

Figure 1:
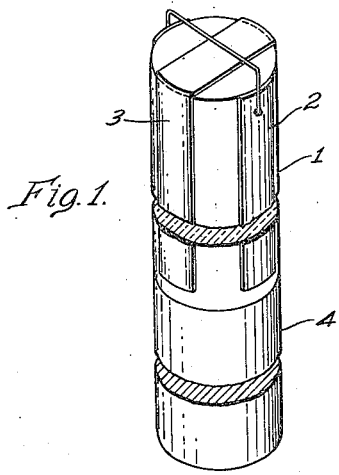
Figure 1 is a perspective view of the crystal element.

Referring to Fig. 1 of the drawing, the vibratile element of the viscosimeter comprises a rod-like piezo-electric crystal 1 having a pair of electrical contact surfaces 2 and 3 respectively disposed and connected diametrically opposite. Attached to the crystal rod 1 as by cementing is a similar rod 4 of any suitable material having low internal damping, such for instance, as stainless steel or a polished rod of fused silica. The composite rod so constructed is to be subjected to torsional vibration. For this reason, the crystal portion 1 thereof is cut along its Y-axis. By properly supporting the composite rod it may be energized to vibrate freely at the frequency determined by the physical characteristic of the crystal element. If the vibration thereof is damped by any surrounding medium, the damping may be interpreted in terms of the viscosity of the particular medium.

Figure 2:
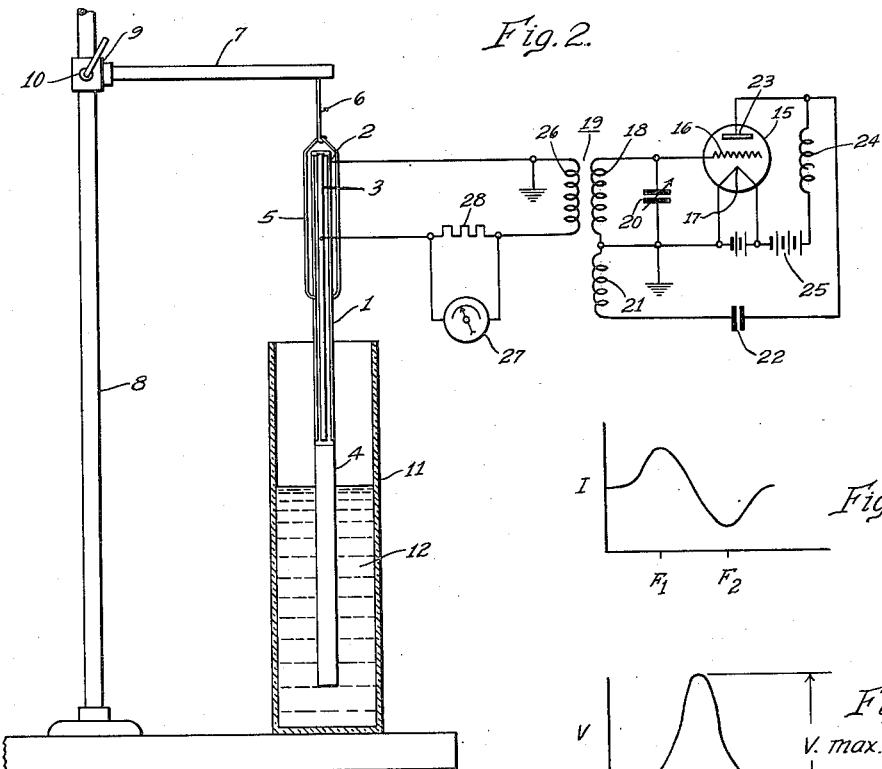
Fig. 2 shows the general arrangement of the viscosity measuring apparatus including a schematic circuit for the energization thereof.

The arrangement for measuring the viscosity is seen in Fig. 2, wherein the vibratile element 1 is supported at its nodal point by a forked member 5 which is freely suspended from a hook 6 held by a framework comprising the horizontal cross-member 7 and the vertical support 8. The cross-member 7 is arranged to be slidably adjustable in the vertical direction along the support 8 by means of the sleeve 9 and the position thereof may be secured at any suitable distance by means of the set screw 10. A vessel 11 containing the liquid 12 to be measured is arranged in such a manner that the metallic portion 4 cemented to the crystal 1 is immersed into the liquid, whereas the crystal itself extends freely above the liquid level. The contact surfaces 2 and 3 perform the function of electrodes of the crystal and are connected to the electrical circuit for energizing the crystal 1. A simple vacuum tube oscillator circuit is shown here by way of example as the source for driving the crystal element. It is, of course, understood that various types of oscillators or power supplies for driving the crystal may be used so long as the frequency delivered thereby is suitable for the particular crystal element. The frequency of oscillations may be in the neighborhood of the higher audio frequencies or therebeyond in the supersonic frequency ranges, depending upon the size and shape of the cut crystal 1. The oscillating circuit herein shown comprises the vacuum tube 15 having its grid element 16 connected to the filament 17 through the frequency determining circuit comprising the primary winding 18 of the transformer 19 tuned by means of the condenser 20 in shunt therewith. Coupled to the primary winding 18 is the feedback coil 21 which receives energy from the anode circuit of the tube 15 through the coupling condenser 22. The anode circuit comprising the anode 23 returns to the filament 17 through the radio frequency choke coil 24 in series with the anode supply source represented here by the battery 25. The output of the oscillator is derived from the secondary winding 26 of the transformer 19 and is directly connected to the contact plates 2 and 3 of the crystal element 1. The current flowing in the output circuit is indicated by the meter 27 which measures the voltage drop across the resistor 28 in series with the output circuit above described.

Figure 3:
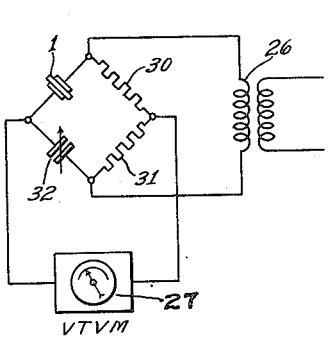
Fig. 3 is a modified circuit arrangement for the indicating portion of the apparatus.

Referring to Fig. 3, the output circuit feeding the crystal element shown here illustrates an alternative method of applying power to the crystal and measuring the response. The vibratile element schematically represented as the crystal 1, is placed in one leg of the bridge circuit comprising resistors 30 and 31 and capacitor 32. The latter is adjustable to a value equal to the capacitance of the crystal unit. The output power of the oscillator from the secondary winding 26 is supplied across one diagonal of the bridge, whereas the indicating meter 27 is connected across the other diagonal. When the bridge is balanced there will be no reading of the meter 27 since the currents will divide equally between the arms thereof. When the crystal is damped due to being placed in a liquid medium, its effective resistance changes which causes the unbalance of the bridge. The meter 27 will read the voltage produced by the unbalance of the bridge due to the change of electrical constants of the crystal element 1 and its indication can be directly related to the relative viscosity of the liquid.

In a practical embodiment a crystal unit and the stainless steel rod were of equal dimensions, each being $\frac{1}{16}$ of an inch in diameter and about 2.5 inches long. The cylindrical vessel for the measurements had an inside diameter of approximately 1 inch and was 4 inches long. The frequency of vibration was about 25 kilocycles. In this practical set-up the range of viscosity indicated by the meter was from .2 to 1000 centipoises, showing that the instrument had a wide range for determining viscosities.

Figure 4:
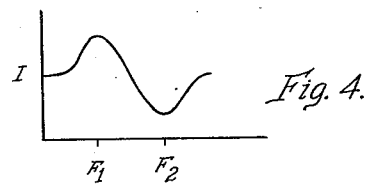
Figs. 4 and 5 represent by means of curves the response characteristics of the device.

In indicating the viscosity, two procedures may be followed: One depends on the current versus frequency characteristics of the crystal element and the other on the voltage versus frequency in a balanced circuit which includes the crystal. The circuit shown in Fig. 2 is particularly suitable for the first mentioned procedure. Assuming the crystal unit is placed in the liquid and the connections to the oscillator are made, the oscillator is adjusted to generate a frequency near but not at the resonance frequency of the crystal element. The output voltage of the oscillator is assumed to have a constant value. Now the frequency of the oscillator is varied through the resonance frequency of the crystal element and the current measured by the meter 27 is a function of frequency. The reading will be as shown in Fig. 4. Near the resonant frequency of the crystal element the current will be a maximum and at a frequency farther away from resonance it will be minimum. From the current values and the frequencies at the maximum and minimum readings, namely at $F_1$ and $F_2$, the equivalent resistance R of the crystal unit can be computed. The resistance R of the crystal unit can be calibrated previously with liquids of known viscosity. Consequently, the resistance values so obtained can be used as indications of the viscosity of various liquids.

Figure 5:
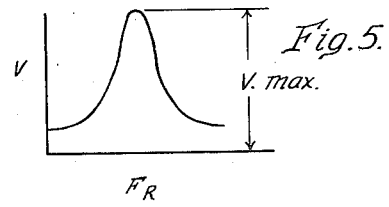

In the modified arrangement shown in Fig. 3, where a bridge circuit is used, the viscosity determination becomes simplified in that only one reading need be observed. Assuming that this circuit is connected to the oscillator, the latter is adjusted to a frequency removed from the resonant frequency of the crystal and the output voltage of the voltmeter observed. The latter should be of a type having high input resistance, such as a suitable vacuum-tube voltmeter. The bridge is now balanced by means of the condenser 32 until the meter reads zero. The frequency of the oscillator may now be varied and the reading of the vacuum tube voltmeter 27 observed as a function of frequency. The voltage reading obtained over the resonant frequency of the crystal is shown by the curve of Fig. 5. The maximum voltage reading will be proportional to $1/R$ where R is the equivalent resistance of the composite quartz-crystal rod. The vacuum-tube voltmeter may be graduated directly in viscosity units since its reading will be related to the viscosity of the liquid in which the composite rod is immersed. The scale is preferably so made as to be inverted and nonlinear so that at the highest reading there will be zero viscosity, whereas at its lowest reading the largest value is indicated which can be read with any precision. Since the relationship between the resistance R of the crystal and viscosity must be determined empirically, the scale will be nonlinear and more likely a square law scale, since $1/R$ equals approximately the square root of viscosity.

In its specific aspects the invention contemplates the determination of viscosity by observing the damping in a piezo-electric crystal excited to execute torsional vibration. In its broader aspects my invention comprehends within its scope the determination of viscosity with other electro-mechanical oscillators such as magneto-strictive oscillators and tuning forks.

I claim as my invention:

1. A viscosity measuring apparatus comprising a body torsionally reactive to electrical energy, means for immersing said body in the liquid to be measured, means for supplying electrical energy thereto and means for indicating the change in reactive force in terms of electrical current flow, said body being a composite rod comprising a piezo-electric crystal portion and a metallic portion rigidly secured thereto, said metallic portion extending into the liquid and being constrained by said crystal portion into torsional vibration within said liquid.

2. A viscosity measuring apparatus comprising a body torsionally reactive to electrical energy, means for immersing said body in the liquid to be measured, means for supplying electrical energy thereto and means for indicating the change in reactive force in terms of electrical current flow, said body being a composite rod comprising a piezo-electric crystal portion and a fused silica portion affixed thereto, said silica portion being constrained by said crystal portion into torsional vibration within said liquid.

SIDNEY SIEGEL.